No. 824,194. PATENTED JUNE 26, 1906.
W. E. McCOY.
BEARING FOR ELECTRICAL MEASURING INSTRUMENTS.
APPLICATION FILED APR. 18, 1903.
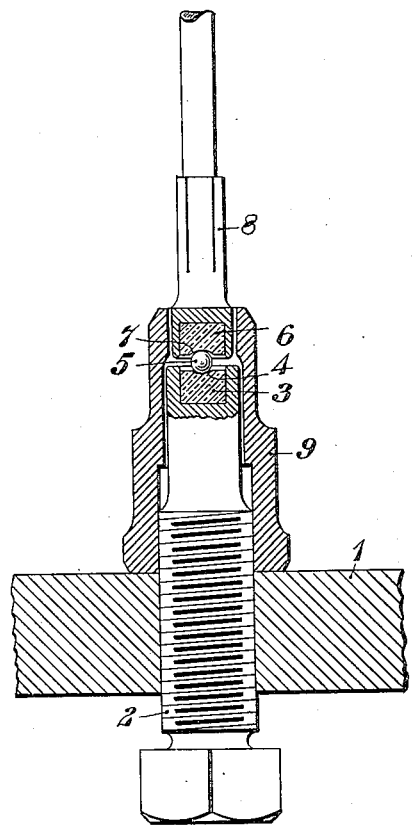
WITNESSES:
C. L. Belcher
J. C. Morse
INVENTOR
Walter E. McCoy
BY
Wesley L. Carr
ATTORNEY.

UNITED STATES PATENT OFFICE.

WALTER EHMSEN McCOY, OF NEW YORK, N. Y., ASSIGNOR TO WESTINGHOUSE ELECTRIC & MANUFACTURING COMPANY, A CORPORATION OF PENNSYLVANIA.

BEARING FOR ELECTRICAL MEASURING INSTRUMENTS.

No. 824,194.     Specification of Letters Patent.     Patented June 26, 1906.

Application filed April 18, 1903. Serial No. 153,340.

*To all whom it may concern:*

Be it known that I, WALTER EHMSEN MCCOY, a citizen of the United States, and a resident of New York, in the county of New York and State of New York, have invented a new and useful Improvement in Bearings for Electrical Measuring Instruments, of which the following is a specification.

My invention relates to electrical measuring instruments, and particularly to those of the integrating or registering type; and it has for its object to provide effective and durable bearings for the spindles of the rotating members of such instruments. With this end in view I have devised the means shown in the accompanying drawing, the single figure of which is a vertical section of my improved bearing and a portion of the supporting framework therefor.

Satisfactory operation of integrating or registering measuring instruments demands the elimination, so far as may be possible, of friction in order that the wear upon the bearings may be reduced to a minimum and also to insure the accurate operation of the instrument under light loads. It has been a usual practice in instruments of this character to provide a concave jewel-step for the lower end of the spindle, and if the form of the step and the end of the spindle engaging therewith are properly designed reasonably satisfactory operation is obtained; but even under such conditions the wear is of such proportions that readjustment of the bearings and new jewels are necessary from time to time in order to preserve satisfactory operation.

My invention is designed to insure satisfactory operation for a substantially unlimited period and has been found in practice to fulfil the requirements.

Since the operating parts of the meter do not pertain to my invention, I have shown merely those parts which directly coöperate, these being a suitable base-piece 1 and an adjustable screw-stud 2, mounted in said base and having a block-jewel 3 set into its upper end. The outer face of the jewel 3 has a shallow concave recess or seat 4, on which rests a polished steel ball 5, and on this ball rests a similar jewel 6, having a concave seat or recess 7, the jewel being set into the lower end of the spindle 8. The bearing comprising the parts just described is inclosed within a tubular casing 9 in order to afford suitable protection for the relatively moving parts. The radius of curvature of the recesses 4 and 7 is greater than that of the ball 5, so that the contact-surfaces between the ball and the jewels are extremely small, whereby friction in the bearing is rendered almost inappreciable. The relative speed of the friction-surfaces is reduced to one-half of that of the ordinary step-bearing, and since the ball rotates at one-half the speed of the shaft it is subject to much less wear than would otherwise be the case. Furthermore, whatever wear takes place is evenly distributed over the entire surface of the ball. Vibration causes merely a rolling motion of the ball instead of a rubbing action, and the arrangement of the parts is such that there is little danger of injury. Even if one of the jewels becomes injured to such an extent as to prevent rotative movement between itself and the ball the shaft-bearing is still as good as the ordinary step-bearing.

I claim as my invention—

1. A bearing for electrical measuring instruments comprising two jewels each of which has a concave bearing-surface of single, uniform curvature and an interposed polished steel ball.

2. A bearing for an electrical measuring instrument shaft or spindle comprising two jewels having opposing concave bearing-surfaces of single, uniform curvature and an interposed polished steel ball the radius of curvature of which is less than that of said bearing-surfaces.

3. A bearing for an electrical measuring instrument shaft or spindle comprising an adjustable stud provided with a jewel having a concave bearing-surface of single, uniform curvature, a jewel mounted in the end of the shaft or spindle and having a concave bearing-surface of single, uniform curvature and a polished steel ball interposed between said bearing-surfaces and having a radius of curvature that is less than that of said surfaces.

4. The combination with a rotatable shaft or spindle provided with a jewel having a concave bearing-surface of single, uniform curvature, of an adjustable stud provided with a jewel having a concave bearing-surface of single, uniform curvature and a ball interposed between said bearing-surfaces the radius of curvature of which is less than that of said bearing-surfaces.

In testimony whereof I have hereunto subscribed my name this 11th day of April, 1903.

WALTER EHMSEN McCOY.

Witnesses:
CLARENCE TERRY,
WM. H. CAPEL.